(12) United States Patent
Wang et al.

(10) Patent No.: US 7,274,174 B2
(45) Date of Patent: Sep. 25, 2007

(54) TEMPERATURE COMPENSATION DEVICE AND METHOD FOR A VOLTAGE REGULATOR

(75) Inventors: Hung-I Wang, Changhua (TW); Jiun-Chiang Chen, Houli Township, Taichung County (TW)

(73) Assignee: Richtek Technology Corp., Hsinchu (TW)

( * ) Notice: Subject to any disclaimer, the term of this patent is extended or adjusted under 35 U.S.C. 154(b) by 84 days.

(21) Appl. No.: 11/229,587

(22) Filed: Sep. 20, 2005

(65) Prior Publication Data

US 2006/0061340 A1    Mar. 23, 2006

(30) Foreign Application Priority Data

Sep. 22, 2004   (TW) .............................. 93128787 A

(51) Int. Cl.
*G05F 1/613* (2006.01)

(52) U.S. Cl. .................. 323/224; 323/283; 323/907

(58) Field of Classification Search ................ 323/224, 323/282, 283–288, 907, 312, 313, 314; 327/538, 327/513
See application file for complete search history.

(56) References Cited

U.S. PATENT DOCUMENTS 6,765,372 B2 *  7/2004  Isham ........................ 323/224

* cited by examiner

*Primary Examiner*—Rajnikant B. Patel
(74) *Attorney, Agent, or Firm*—Rosenberg, Klein & Lee

(57) ABSTRACT

In a voltage regulator including an inductor current flowing through a sense element with a first temperature coefficient, and a current sense circuit for generating a current sense signal related to the first temperature coefficient by sensing the inductor current from the sense element, a temperature compensation device and method determines a second temperature coefficient according to the first temperature coefficient and temperature variation, and produces a compensation signal with the second temperature coefficient to compensate variations in the current sense signal caused by the first temperature coefficient.

14 Claims, 6 Drawing Sheets

TEMPERATURE COMPENSATION DEVICE AND METHOD FOR A VOLTAGE REGULATOR

FIELD OF THE INVENTION

The present invention is related generally to a voltage regulator, and more particularly, to a temperature compensation device and method for a voltage regulator.

BACKGROUND OF THE INVENTION

Voltage regulators have been applied extensively in various electronic products as power supplies. In state-of-art voltage regulators, in order to prevent load from being damaged due to voltage spike of the output in transients, voltage droop function is adapted for diminishing the voltage spike on the load in transients. FIG. 1 schematically shows a conventional voltage regulator 100 with voltage droop function, in which driver 104 switches transistors 106 and 108 coupled in series between input voltage Vin and ground GND in response to pulse width modulation (PWM) signal provided by control circuit 102. Thereby, inductor current IL is generated to charge output capacitor Co so that output voltage Vo is produced. In the control circuit 102, from the voltage drop across current sense resistor Rs due to the inductor current IL flowing therethrough, current sense circuit 110 produces current sense signal $$Ix = \frac{IL \times Rs}{K}, \quad \text{[EQ-1]}$$

where K is the equivalent resistance of the current sense circuit 110. The current sense signal Ix passes through droop resistor $R_{ADJ}$ and produces load line droop voltage $$Vdroop = Ix \times R_{ADJ}. \quad \text{[EQ-2]}$$

Because of virtual ground, the voltage on pin 116 intends to be equal to reference voltage Vref, and therefore the output voltage will be $$Vo = Vref - Vdroop. \quad \text{[EQ-3]}$$

Error amplifier 112 generates error signal EA from the difference between its inverting and non-inverting inputs, and PWM comparator 114 compares the error signal EA with ramp signal Vramp to determine the PWM signal for the driver 104. From the equations EQ-1, EQ-2 and EQ-3, it is known that the output voltage Vo of the regulator 100 will decrease as the inductor current IL increases.

FIG. 2 schematically shows another conventional voltage regulator 200 with voltage droop function, which comprises control circuit 102, driver 104, transistors 106 and 108, current sense circuit 110, error amplifier 112, PWM comparator 114, and current sense resistor Rs as well. However, the reference voltage Vref is coupled to the non-inverting input of the error amplifier 112 via the droop resistor $R_{ADJ}$ and pin 116, and the output of the current sense circuit 110 is coupled to the non-inverting input of the error amplifier 112. When the current sense signal Ix passes through the droop resistor $R_{ADJ}$, load line droop voltage Vdroop is produced as described in the equation EQ-2. The inverting input of the error amplifier 112 is coupled to the output Vo, and thereby the output voltage Vo follows the equation EQ-3 due to virtual ground. Consequently, according to the equations EQ-1, EQ-2 and EQ-3, it is known that the output voltage Vo of the regulator 200 will decrease as the inductor current IL increases.

In a voltage regulator with droop function, the load line droop signal proportional to the output current is sensed by the current sense resistor. Unfortunately, the resistance of an ordinary resistor is a function of temperature, so that the load line is also the function of temperature. Consequently, incorrect operations may happen because the control circuit 102 provides incorrect PWM signal due to the incorrect current sense signal Ix caused by the temperature coefficient of the current sense resistor Rs. In order to prevent mal-operations by the control circuit 102 resulted from temperature variations, the droop resistor $R_{ADJ}$ with proper negative temperature coefficient is chosen to be positioned in the vicinity of the current sense resistor Rs to compensate the voltage variations caused by temperature changes on the current sense resistor Rs with positive temperature coefficient. Nevertheless, resistors with negative temperature coefficients are not ordinary resistors and thereby are more expensive. In addition, in order to position the droop resistor $R_{ADJ}$ nearby the current sense resistor Rs, the conductive wire between the pin 116 and droop resistor $R_{ADJ}$ is lengthened, which makes the pin 116 tend to be affected by switching noises. Moreover, there is always a distance between the resistors $R_{ADJ}$ and Rs, and hence the temperature changes in the resistors $R_{ADJ}$ and Rs are different, thereby introducing inaccurate compensation to the current sense signal Ix. Furthermore, the position of the droop resistor $R_{ADJ}$ in one voltage regulator may be different from that in another, and thereby various resistors with different negative temperature coefficients have to be prepared for the droop resistor $R_{ADJ}$ in applications of various voltage regulators.

SUMMARY OF THE INVENTION

One object of the present invention is to provide a temperature compensation device and method for a voltage regulator.

Another object of the present invention is to provide a temperature compensation device and method to cancel the temperature coefficient of the load line signal to zero, so as to obtain a temperature-invariant load line.

Yet another object of the present invention is to provide a temperature compensation device and method without lengthened conductive wire to avoid noise interferences.

Still another object of the present invention is to provide a temperature compensation device and method having tunable temperature coefficient for compensating variations caused by current sense resistor due to temperature changes.

In a voltage regulator including an inductor current flowing through a sense element with a first temperature coefficient, and a current sense circuit for generating a current sense signal related to the first temperature coefficient by sensing the inductor current from the sense element, according to the present invention, a temperature compensation device comprises a temperature coefficient tuner to determine a second temperature coefficient according to the first temperature coefficient and a temperature variation, and a compensation signal generator coupled to the temperature coefficient tuner to produce a compensation signal related to the second temperature coefficient to compensate the current sense signal. In one embodiment, the temperature coefficient tuner comprises a thermistor and temperature-invariant resistors to constitute an equivalent resistor with the second temperature coefficient, and the second temperature coefficient is determined by selecting the resistances of the temperature-invariant resistors. In one embodiment of the compensation signal generator, a current source supplies a temperature-invariant current to the temperature coefficient tuner to produce a voltage related to the second temperature coefficient, thereby further generating the compensation signal to compensate variations in the current sense signal caused by the first temperature coefficient.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
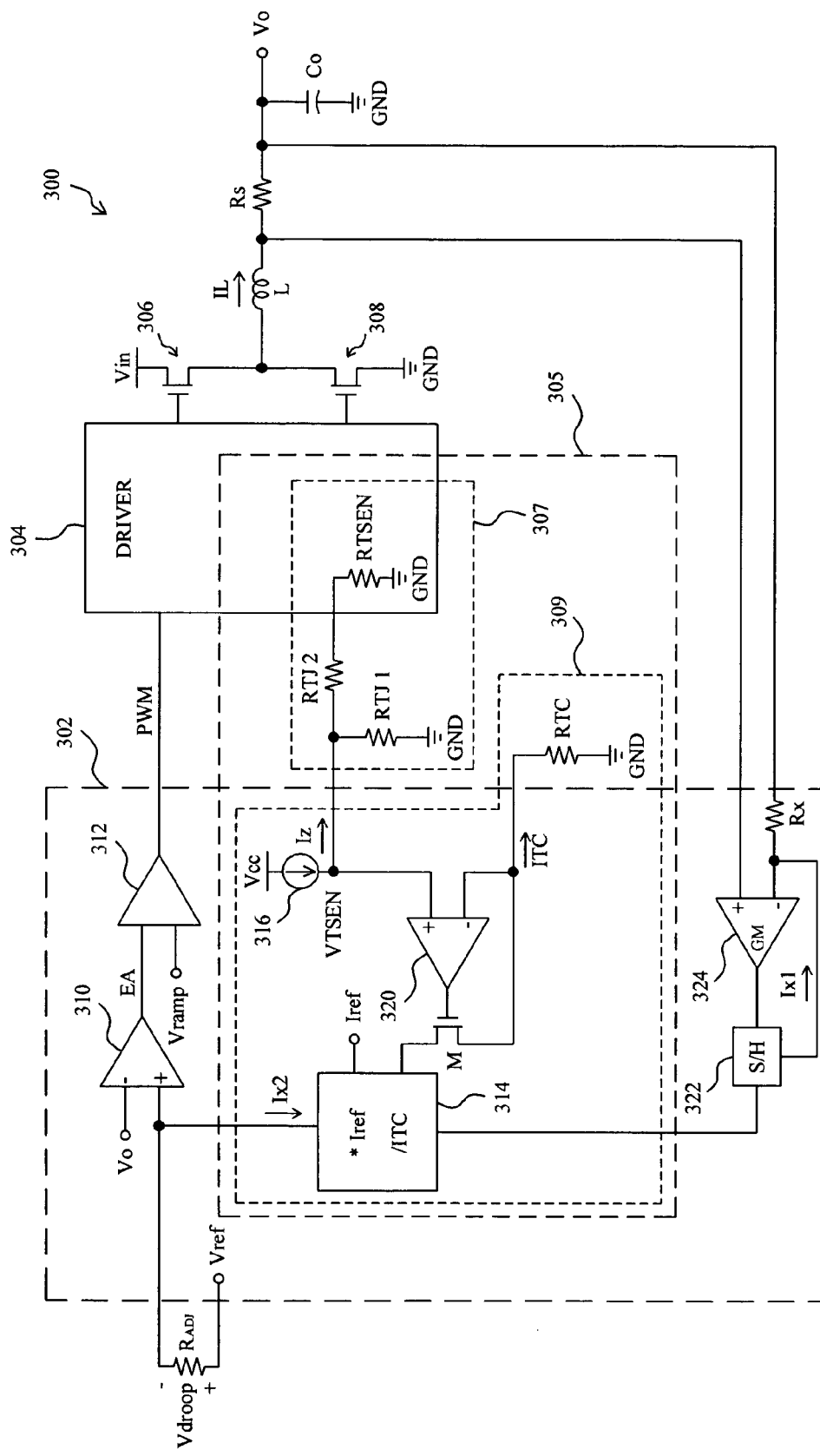
FIG. 3 schematically shows a voltage regulator according to the present invention.

According to the present invention, FIG. 3 schematically shows a voltage regulator 300, in which control circuit 302 comprises error amplifier 310 in response to the output voltage Vo of the regulator 300 and reference voltage Vref to produce error signal EA for PWM comparator 312 to compare with ramp signal Vramp to thereby generate PWM signal, and with the PWM signal driver 304 switches transistors 306 and 308 coupled in series between input voltage Vin and ground GND to produce inductor current IL flowing through inductor L to charge output capacitor Co to generate the output voltage Vo. According to the voltage drop across current sense resistor Rs that is coupled to the inductor L, transconductive amplifier 324, serving as current sense circuit, generates current sense signal Ix1 supplied to temperature compensation device 305 via sample-and-hold circuit 322. Owing to the current sense resistor Rs having temperature coefficient TC1, the current sense signal Ix1 will be affected by the temperature coefficient TC1. In order to eliminate the influence of the temperature coefficient TC1 for the control circuit 302 to operate correctly, the temperature compensation device 305 will compensate the current sense signal Ix1 so that current sense signal Ix2 invariant to the temperature coefficient TC1 is obtained to couple to resistor $R_{ADJ}$ to produce load line droop voltage Vdroop.

Figure 4:
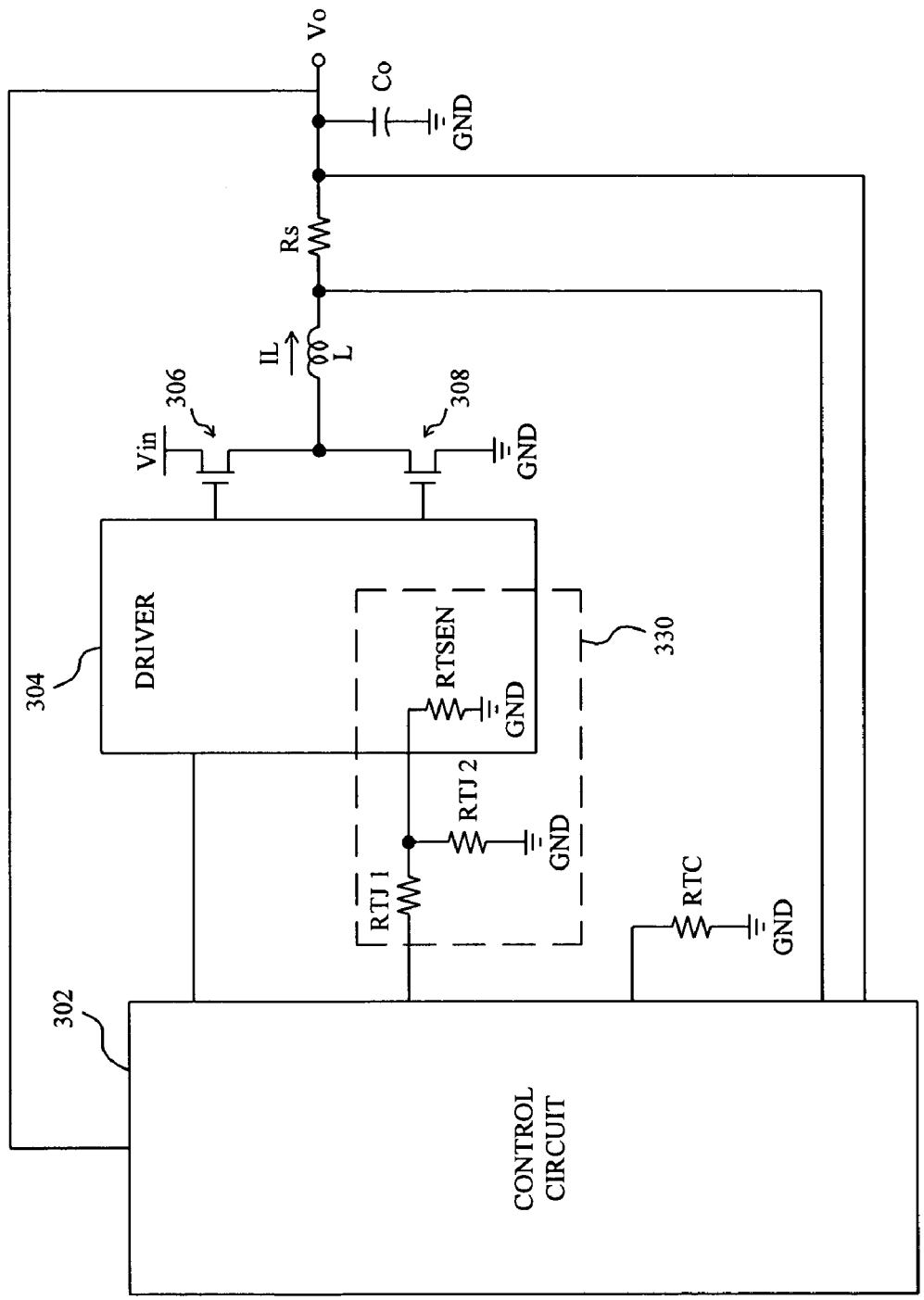
FIG. 4 shows another embodiment for the temperature coefficient tuner in FIG. 3.

In the temperature compensation device 305, temperature coefficient tuner 307 comprises thermistor RTSEN with fixed temperature coefficient, and variable resistors RTJ1 and RTJ2 that are temperature invariant. In this embodiment, the thermistor RTSEN is integrated in the chip of the driver 304. Generally, a chip of the driver 304 has excess pins, and hence the pin count will not increase when the thermistor RTSEN is integrated in the chip of the driver 304. In addition, the driver 304 is very close to the transistors 306 and 308, which are dominant heat sources, to the inductor L, as well as to the current sense resistor Rs. Thereby, the difference between the temperature changes in the thermistor RTSEN and current sense resistor Rs is extremely small. Moreover, by integrating the thermistor RTSEN in the chip of the driver 304, its resistance and temperature coefficient can be made more precisely by using various technologies in the manufacturing process. In the temperature coefficient tuner 307, the combination of the thermistor RTSEN and resistors RTJ1 and RTJ2 constitutes an equivalent resistor with temperature coefficient TC2. Those skilled in the art of electronic circuits may know the temperature coefficient is $$TC2 = \frac{d\left\{\frac{RTJ1 \times [RTJ2 + R(T2)]}{RTJ1 + [RTJ2 + R(T2)]}\right\}}{dT2}, \qquad [EQ\text{-}4]$$

where T2 is the temperature of the thermistor RTSEN, and R(T2) is the resistance of the thermistor RTSEN at temperature T2. In another embodiment, as the temperature coefficient tuner 330 shown in FIG. 4, the variable resistor RTJ1 is coupled in series to the parallel connection of the variable resistor RTJ2 and thermistor RTSEN, and the temperature coefficient of this equivalent resistor is $$TC2 = \frac{d\left[RTJ1 + \frac{RTJ2 \times R(T2)}{RTJ2 + R(T2)}\right]}{dT2}. \qquad [EQ\text{-}5]$$

From the equation EQ-4 or EQ-5, it is known that the temperature coefficient TC2 of the equivalent resistor can be tuned by adjusting the resistances of the variable resistors RTJ1 and RTJ2. One skilled in the art knows that in order to compensate voltage changes caused by the temperature coefficient TC1 of the current sense resistor Rs, it should be satisfied that $$TC2 \times \Delta T2 = \Delta T1 \times TC1, \qquad [EQ\text{-}6]$$

where $\Delta T1$ is the temperature change on the current sense resistor Rs, and $\Delta T2$ is the temperature change on the thermistor RTSEN. According to the equation EQ-6, the temperature coefficient required for the equivalent resistor in the temperature coefficient tuner 307 can be derived as $$TC2 = \frac{\Delta T1 \times TC1}{\Delta T2}. \qquad [EQ\text{-}7]$$

In the regard of current technology, it is not difficult to obtain the temperature changes on the current sense resistor Rs and the thermistor RTSEN. Referring to FIG. 3, current source 316 in the compensation signal generator 309 supplies temperature-invariant current Iz to the temperature coefficient tuner 307, and accordingly the equivalent resistor composed of the resistors RTSEN, RTJ1 and RTJ2 will produce the voltage drop $$VTSEN = Iz \times R_{TT}(TC2), \qquad [EQ\text{-}8]$$

where $R_{TT}(TC2)$ is the resistance of the equivalent resistor. By the equation EQ-8, it is shown that the voltage VTSEN is also dependent on the temperature coefficient TC2. The non-inverting input of buffer 320 is coupled with the voltage VTSEN, and according to virtual ground, the voltage on the inverting input of the buffer 320 is equal to the voltage VTSEN. Thereby, passing through temperature-invariant resistor RTC, the current serving as the compensation signal is $$ITC = \frac{VTSEN}{RTC} = \frac{Iz \times R_{TT}(TC2)}{RTC}. \quad [EQ\text{-}9]$$

By the equation EQ-9, it is known that the current ITC is dependent on the temperature coefficient TC2. Operational circuit 314 divides the current sense signal Ix1 by the current ITC to result in current sense signal Ix2 to compensate the influence of the temperature coefficient TC1 on the current sense signal Ix1.

Figure 2:
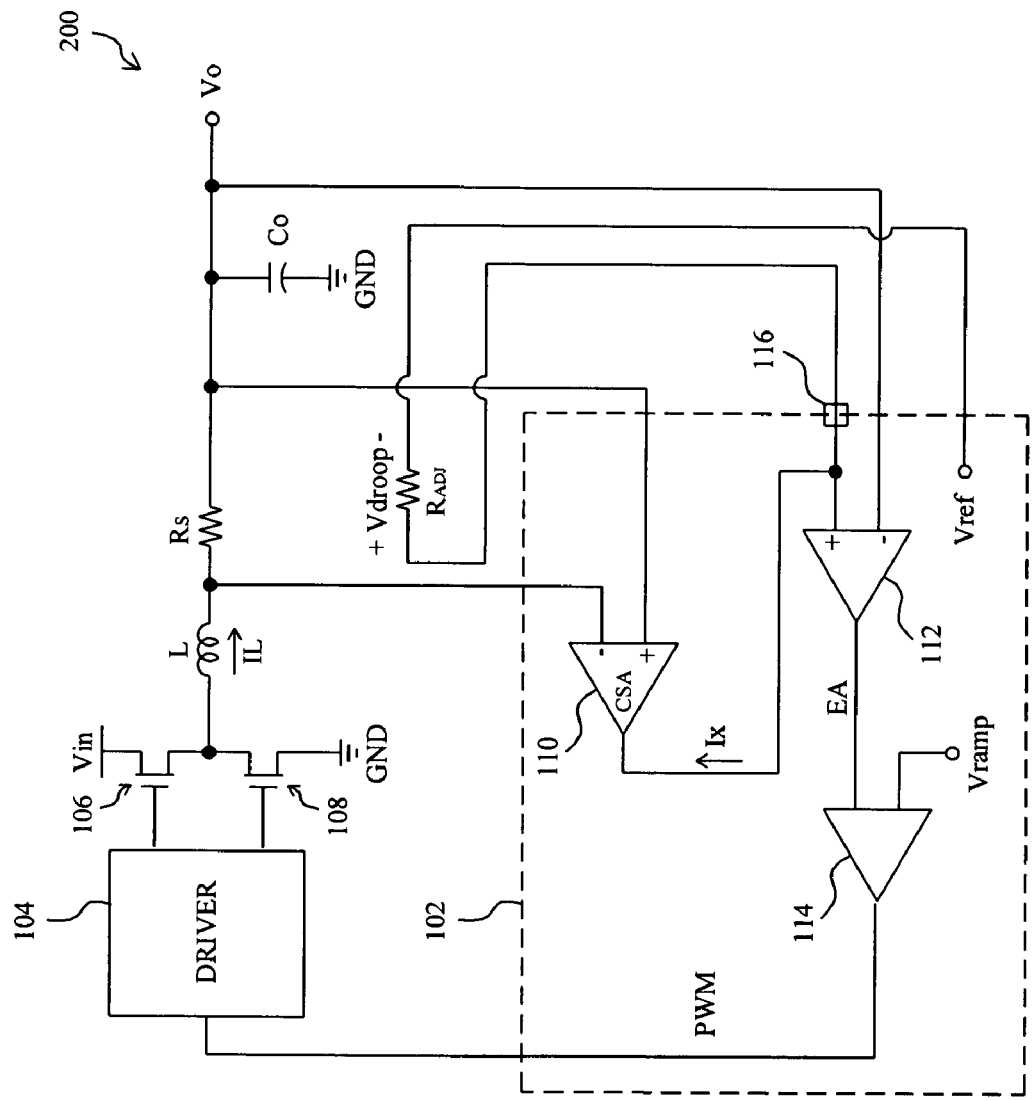
FIG. 2 schematically shows another conventional voltage regulator with voltage droop function.

In FIG. 3, the temperature compensation device 305 makes use of the variable resistors RTJ1 and RTJ2 and the thermistor RTSEN to form an equivalent resistor, and tunes the temperature coefficient of the equivalent resistor by adjusting the resistance of the variable resistors RTJ1 and RTJ2. Consequently, it is not necessary to prepare resistors with various temperature coefficients for various voltage regulator applications, and the temperature coefficient of the thermistor RTSEN can be positive. Thus, the cost can be reduced effectively without the need to use extraordinary resistors with negative temperature coefficients. Furthermore, it is not necessary for the resistor $R_{ADJ}$ in FIG. 3 to lengthen the conductive wire for arranging the resistor $R_{ADJ}$ close to the current sense resistor Rs as the conventional voltage regulator 200 shown in FIG. 2. Hence, noise interference caused by lengthened conductive wire can be prevented.

Figure 5:
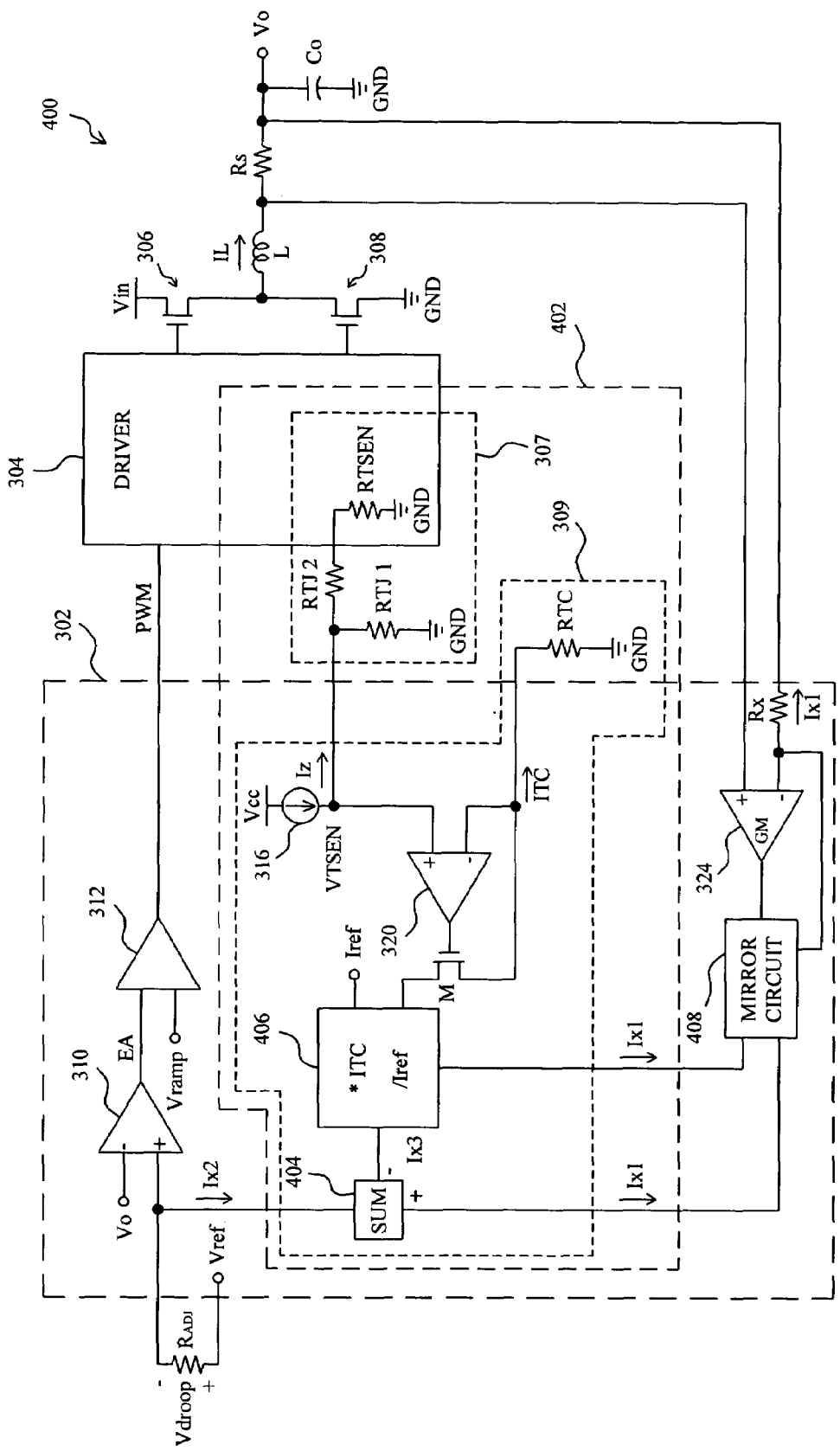
FIG. 5 schematically shows another voltage regulator according to the present invention.

In the temperature compensation device 305, the current sense signal Ix1 is divided by the current ITC to obtain the current sense signal Ix2 in order to compensate the influence of the temperature coefficient TC1 on the current sense signal Ix1. Nevertheless, the compensation function can also be achieved by applying other operational methods. As shown in FIG. 5, likewise, voltage regulator 400 comprises control circuit 302, driver 304, transistors 306 and 308, error amplifier 310, PWM comparator 312, transconductive amplifier 324, and resistors Rs and $R_{ADJ}$. In temperature compensation device 402, likewise, current source 316, transistor M, buffer 320, and resistors RTSEN, RTJ1, RTJ2, and RTC are included. However, in this embodiment, the current sense signal Ix1 is mirrored by mirror circuit 408, and two identical current sense signals Ix1 are produced accordingly, for providing for operational circuits 404 and 406. The current sense signal Ix1 supplied to the operational circuit 406 is multiplied by current ITC and divided by temperature-invariant reference current Iref to obtain current signal $$Ix3 = Ix1 \times ITC \div Iref \quad [EQ\text{-}10]$$

In the operational circuit 404, the other current sense signal Ix1 minus the signal Ix3 to obtain the current sense signal Ix2 for compensating variations on the current sense signal Ix1 caused by the temperature coefficient TC1.

Figure 6:
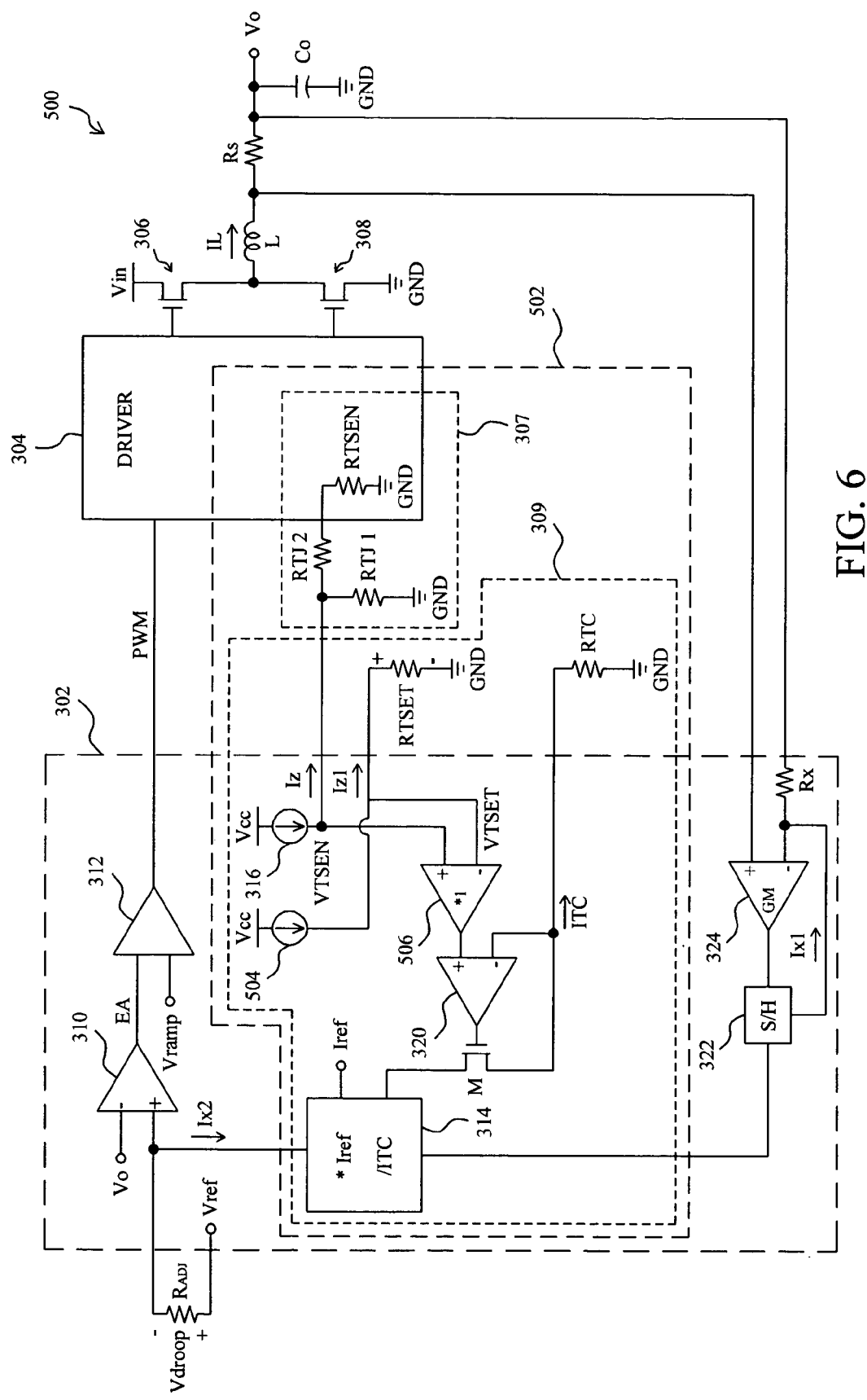
FIG. 6 schematically shows a voltage regulator with configurable compensation temperature according to the present invention.

Moreover, the temperature compensation device according to the present invention can also be configured with threshold temperature for compensation. FIG. 6 shows voltage regulator 500 with configurable compensation temperature according to the present invention, which also comprises control circuit 302, driver 304, transistors 306 and 308, error amplifier 310, PWM comparator 312, sample-and-hold circuit 322, transconductive amplifier 324, and resistors Rs and $R_{ADJ}$. In temperature compensation device 502, temperature coefficient tuner 307 also includes resistors RTSEN, RTJ1, and RTJ2 to form an equivalent resistor with temperature coefficient TC2. Compensation signal generator 309 supplies current Iz provided by current source 316 to the temperature coefficient tuner 307 to produce voltage VTSEN, and temperature-invariant current Iz1 provided by current source 504 to temperature-invariant resistor RTSET to produce threshold voltage VTSET. Analog summing circuit 506 has a positive input coupled with the voltage VTSEN and a negative input coupled with the threshold voltage VTSET. When the temperature of the thermistor RTSEN increases, the voltage VTSEN will increase as well. As the temperature of the thermistor RTSEN increases to a predetermined threshold, the voltage VTSEN will be greater or equal to the threshold voltage VTSET, such that the summing circuit 506 produces output $$Vcomp = VTSEN - VTSET, \quad [EQ\text{-}11]$$

to the non-inverting input of buffer 320. Due to virtual ground, the voltage on the inverting input of the buffer 320 is equal to Vcomp, and thereby determining the current passing through resistor RTC for the compensation signal $$ITC = \frac{Vcomp}{RTC}. \quad [EQ\text{-}12]$$

Operational circuit 314 receives the current ITC through transistor M, and divides the current sense signal Ix1 by the current ITC to determine the current sense signal Ix2 for compensating variations caused by the temperature coefficient TC1 of the current sense resistor Rs.

Figure 1:
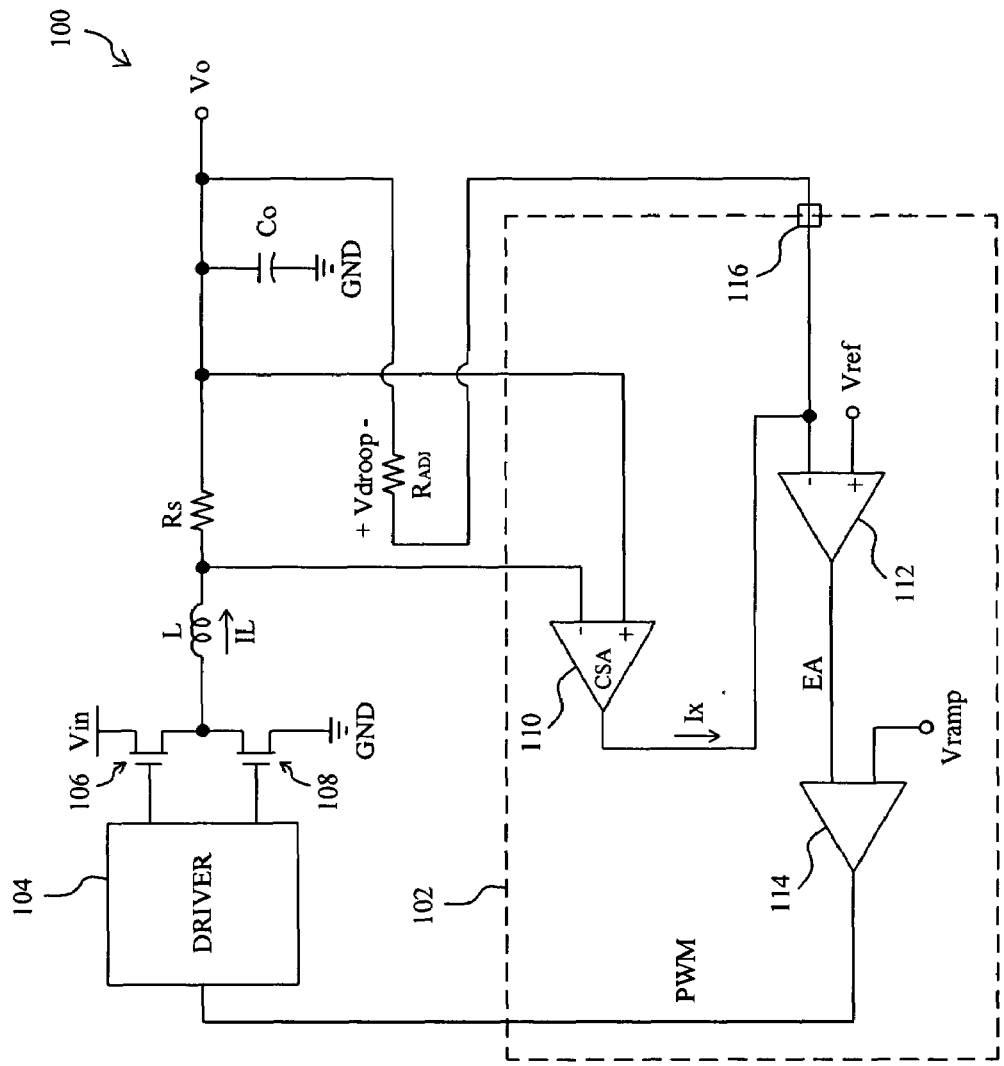
FIG. 1 schematically shows a conventional voltage regulator with voltage droop function.

In the foregoing embodiments, the resistor $R_{ADJ}$ is coupled between the current sense signal Ix2 and reference voltage Vref. Alternatively, the resistor $R_{ADJ}$ can be coupled between the current sense signal Ix2 and output Vo of the regulator, as the conventional regulator 100 shown in FIG. 1 does. In addition, although the method for sensing the inductor current IL in the foregoing embodiments is sensing the voltage drop across the current sense resistor Rs coupled in series to the inductor L, other methods, such as sensing the voltage drop across the parasitic resistor of the inductor L, sensing the voltage drop across the resistor coupled in series to the transistor 308, and sensing the voltage drop across the transistor 308, can also be adopted. Single-phase voltage regulator is used in the foregoing embodiments to illustrate the principles of the present invention. In multi-phase voltage regulators, the described principles in the foregoing single-phase voltage regulators can be applied to implement as well.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A temperature compensation device for a voltage regulator including a driver for switching a power stage to produce an inductor current flowing through a sense element with a first temperature coefficient, and a current sense circuit for generating a current sense signal related to the first temperature coefficient by sensing the inductor current from the sense element, the device comprising:

a temperature coefficient tuner for determining a second temperature coefficient according to the first temperature coefficient and a temperature variation, the temperature coefficient tuner including a passive network defining an equivalent resistor with the second temperature coefficient tuned by adjusting a resistance value of at least one temperature-invariant component of the passive network; and a compensation signal generator coupled to the temperature coefficient tuner for producing a compensation signal related to the second temperature coefficient to compensate the current sense signal.

2. A temperature compensation device for a voltage regulator including a driver for switching a power stage to produce an inductor current flowing through a sense element with a first temperature coefficient, and a current sense circuit for generating a current sense signal related to the first temperature coefficient by sensing the inductor current from the sense element, the device comprising:

a temperature coefficient tuner for determining a second temperature coefficient according to the first temperature coefficient and a temperature variation, the temperature coefficient tuner including:

a thermistor having a third temperature coefficient;

a first temperature-invariant resistor having at least one end coupled to the thermistor; and a second temperature-invariant resistor having at least one end coupled to the first temperature-invariant resistor;

wherein the thermistor and the first and second temperature-invariant resistors form an equivalent resistor with the second temperature coefficient tuned by adjusting resistances of the first and second temperature invariant resistors; and a compensation signal generator, coupled to the temperature coefficient tuner, for producing a compensation signal related to the second temperature coefficient to compensate the current sense signal.

3. The device of claim 2, wherein the first and second resistors are variable resistors.

4. The device of claim 2, wherein the thermistor is integrated in a chip containing the driver.

5. The device of claim 2, wherein the compensation signal generator comprises:

a current source for supplying a temperature-invariant current to the equivalent resistor to produce a voltage related to the second temperature coefficient; and a third temperature-invariant resistor for producing the compensation signal according to the voltage related to the second temperature coefficient.

6. The device of claim 2, wherein the compensation signal generator comprises:

a current source for supplying a temperature-invariant current to the equivalent resistor to produce a first voltage with the second temperature coefficient;

a temperature-invariant threshold voltage;

an analog summing circuit for producing a second voltage related to the second temperature coefficient when the first voltage is greater than or equal to the threshold voltage;

a buffer having a non-inverting input coupled with the second voltage; and a third temperature-invariant resistor, coupled between an inverting input of the buffer and a reference voltage, for producing the compensation signal according to the second voltage.

7. The device of claim 1, further comprising an operational circuit for dividing the current sense signal by the compensation signal to compensate the current sense signal.

8. The device of claim 1, further comprising:

a mirror circuit for mirroring the first current sense signal to produce a second current sense signal;

a first operational circuit for producing a third current sense signal by multiplying the second current sense signal by the compensation signal; and a second operational circuit for subtracting the third current sense signal from the first current sense signal to compensate the current sense signal.

9. A temperature compensation method for a voltage regulator including an inductor current flowing through a sense element with a first temperature coefficient, and a current sense circuit for generating a current sense signal related to the first temperature coefficient by sensing the inductor current from the sense element, the method comprising the steps of:

determining a second temperature coefficient according to the first temperature coefficient and a temperature variation, the step of determining a second temperature coefficient includes:

forming a passive network defining an equivalent resistor with the second temperature coefficient tuned by adjusting a resistance value of at least one temperature-invariant component of the passive network; and producing a compensation signal related to the second temperature coefficient to compensate the current sense signal.

10. The method of claim 9, wherein the step of forming a passive network comprises the step of combining a thermistor and one or more temperature-invariant resistors to form the equivalent resistor with the second temperature coefficient.

11. The method of claim 10, wherein the step of producing a compensation signal related to the second temperature coefficient comprises the steps of:

supplying a temperature-invariant current to the equivalent resistor for producing a voltage related to the second temperature coefficient; and producing the compensation signal according to the voltage related to the second temperature coefficient.

12. The method of claim 10, wherein the step of producing a compensation signal related to the second temperature coefficient comprises the steps of:

supplying a temperature-invariant current to the equivalent resistor for producing a first voltage with the second temperature coefficient;

providing a temperature-invariant threshold voltage;

producing a second voltage related to the second temperature coefficient when the first voltage is greater than or equal to the threshold voltage; and producing the compensation signal according to the second voltage.

13. The method of claim 9, further comprising the step of dividing the current sense signal by the compensation signal to compensate the current sense signal.

14. The method of claim 9, further comprising the steps of:

mirroring the first current sense signal for producing a second current sense signal;

multiplying the second current sense signal by the compensation signal for producing a third current sense signal; and subtracting the third current sense signal from the first current sense signal for compensating the current sense signal.

* * * * *